(12) United States Patent
Stefani et al.

(10) Patent No.: US 10,882,494 B2
(45) Date of Patent: Jan. 5, 2021

(54) WIPER MOTOR AND WIPING APPARATUS FOR WIPING A VEHICLE WINDOW

(71) Applicant: Valeo Systèmes d'Essuyage, Le Mesnil Saint Denis (FR)

(72) Inventors: Siegfried Stefani, Bietigheim-Bissingen (DE); Jörg Bürkle, Bietigheim-Bissingen (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 528 days.

(21) Appl. No.: 15/529,627

(22) PCT Filed: Dec. 16, 2015

(86) PCT No.: PCT/EP2015/079944
§ 371 (c)(1),
(2) Date: May 25, 2017

(87) PCT Pub. No.: WO2016/102263
PCT Pub. Date: Jun. 30, 2016

(65) Prior Publication Data
US 2017/0259787 A1    Sep. 14, 2017

(30) Foreign Application Priority Data

Dec. 23, 2014 (DE) .......... 10 2014 119 528

(51) Int. Cl.
*B60S 1/08* (2006.01)
*B60S 1/48* (2006.01)
*B60S 1/52* (2006.01)

(52) U.S. Cl.
CPC ............. *B60S 1/08* (2013.01); *B60S 1/482* (2013.01); *B60S 1/524* (2013.01)

(58) Field of Classification Search
CPC .......... B60S 1/522; B60S 1/524; B60S 1/482; B60S 1/483; B60S 1/08; H02P 3/00; H02P 3/06; H02P 3/08; H02P 5/00; H02P 5/46
(Continued)

(56) References Cited

U.S. PATENT DOCUMENTS

| 4,285,089 A | 8/1981 | Takahashi et al. |
| 2007/0234499 A1* | 10/2007 | Thibodeau ............... B60S 1/46 |
| | | 15/250.01 |
| 2015/0113754 A1* | 4/2015 | Umeno .................. B60S 1/482 |
| | | 15/250.04 |

FOREIGN PATENT DOCUMENTS

| DE | 4116099 | * 11/1992 |
| FR | 2927295 A1 | 8/2009 |

(Continued)

OTHER PUBLICATIONS

Machine translation of description portion of French publication 2827295, published Aug. 2009 (Year: 2009).*

(Continued)

*Primary Examiner* — Gary K. Graham
(74) *Attorney, Agent, or Firm* — Osha Bergman Watanabe & Burton LLP

(57) ABSTRACT

The invention relates to a wiper motor (10), with an output shaft (11) which rotates in exclusively one direction (12) and is designed at least indirectly to move at least one wiper blade (1) between two reversal positions (A, B). According to the invention, it is provided that the wiper motor (10) has means (30) which are designed at least indirectly to activate a pump (25) for conveying a cleaning fluid in such a manner that cleaning fluid can be applied to a vehicle window (2) exclusively in front of the wiper blade (1) in the respective wiping direction.

14 Claims, 5 Drawing Sheets

Figure 1:
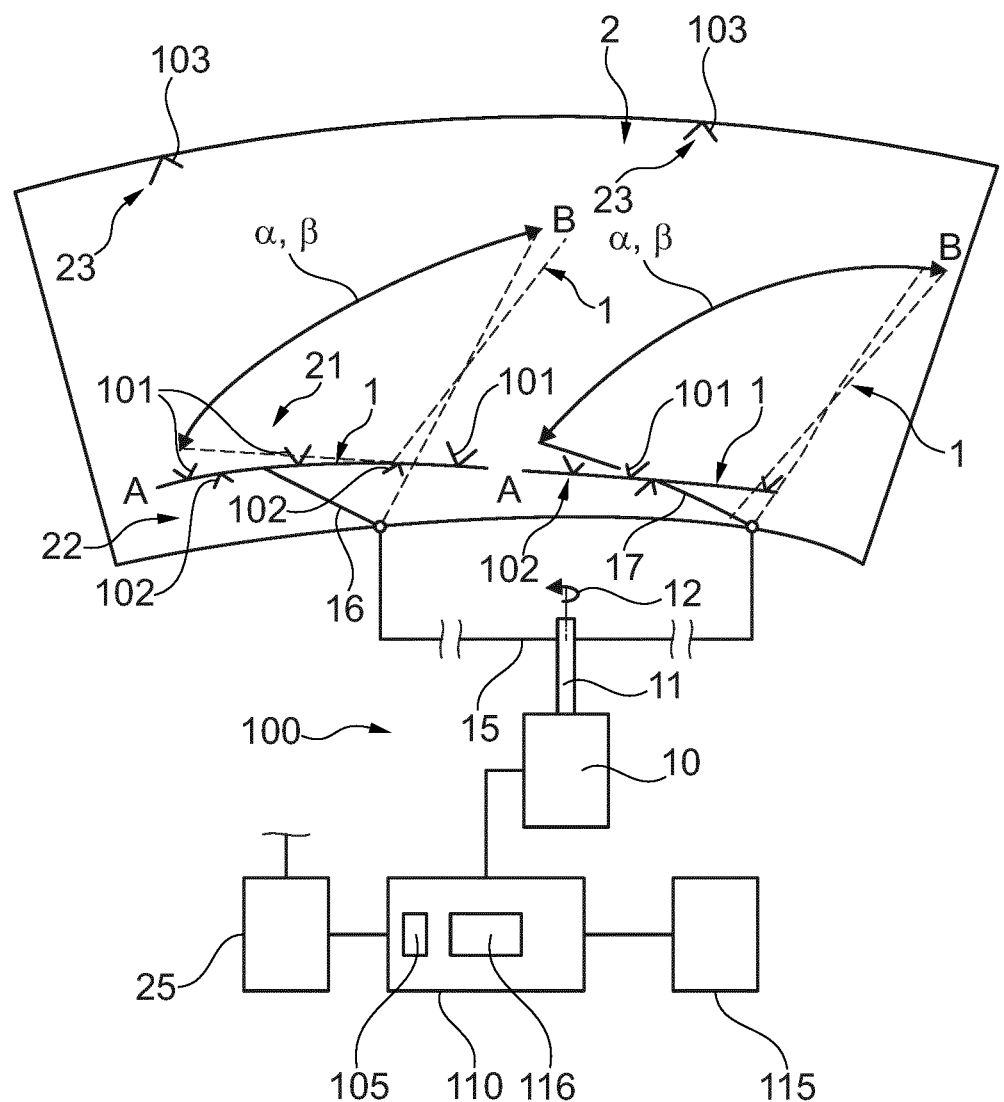

(58) Field of Classification Search
USPC ............ 15/250.04, 250.02; 239/284.1, 284.2
See application file for complete search history.

(56) References Cited

FOREIGN PATENT DOCUMENTS

| | | |
|---|---|---|
| JP | S54-153440 A | 12/1979 |
| JP | S55-087848 U | 6/1980 |
| JP | S63-179272 U | 11/1988 |
| JP | H07-037836 U | 7/1995 |
| JP | 2014-237418 A | 12/2014 |
| JP | 2015-134563 A | 7/2015 |
| WO | 2009/141245 A1 | 11/2009 |
| WO | 2012/076562 A1 | 6/2012 |
| WO | 2007/000346 A1 | 2/2016 |
| WO | 2009/141275 A1 | 2/2016 |

OTHER PUBLICATIONS

Machine translation of description portion of German publication 4116099, published Nov. 1992. (Year: 1992).*
Machine translation of description portion of French publication 2927295, published Aug. 2008. (Year: 2008).*
Machine translation of description portion of WO publication 2012/076562, published Jun. 2012 (Year: 2012).*
International Search Report issued in corresponding application No. PCT/EP2015/079944 dated Feb. 16, 2016 (3 pages).
Written Opinion of the International Searching Authority issued in corresponding application No. PCT/EP2015/079944 dated Feb. 16, 2016 (5 pages).
Notification of Reason for Rejection in corresponding Japanese Application No. 2017-533898, dated Aug. 23, 2019 (17 pages).

* cited by examiner

WIPER MOTOR AND WIPING APPARATUS FOR WIPING A VEHICLE WINDOW

PRIOR ART

The invention relates to a wiper motor according to the precharacterizing clause of claim 1. Furthermore, the invention relates to a wiping apparatus for wiping a vehicle window, with the use of a wiper motor according to the invention.

A wiper motor for cleaning a vehicle window according to the precharacterizing clause of claim 1 is already known in practice. Said wiper motor has an output shaft which is driven in just one direction of rotation and is coupled to a wiper linkage of the wiping apparatus in such a manner that a movement of a wiper blade to and fro can be achieved. A wiper motor of this type is therefore constructed relatively simply since the wiper motor in particular does not have to be designed as a reversible wiper motor in order to realise the different movement directions of a wiper blade.

Furthermore, a wiping apparatus in which the wiper blades have spray openings on the longitudinal sides thereof is known from the applicant's WO 2007/000346 A1. The wiping apparatus is operated in such a manner that a cleaning fluid is in each case applied to the vehicle window only from the spray nozzles, in the direction of which the wiper blade is currently moving. For the activation of the spray nozzles, a wiping apparatus of this type requires the information as to the direction in which the wiper blade is currently moving. This takes place in practice by the fact that the wiper motor used for this purpose is customarily designed as a reversible wiper motor, i.e. a wiper motor, the direction of rotation of which is reversible, wherein the wiper motor additionally has a sensor device, customarily in the form of a Hall sensor device, which is designed to detect the immediate direction of rotation and position of the output shaft of the wiper motor in order therefore to permit a timely activation of the spray nozzles or of a pump, which is arranged in operative connection with the spray nozzles, for conveying the cleaning fluid.

DISCLOSURE OF THE INVENTION

Starting from the presented prior art, the invention is based on the object of developing a wiper motor according to the precharacterizing clause of claim 1 in such a manner that said wiper motor can be used in wiping apparatuses which are designed to dispense cleaning fluid in front of the wiper blade only in the direction of movement of the wiper blade.

According to the invention, this object is achieved in the case of a wiper motor with the characterizing features of claim 1 in that the wiper motor has means which are designed at least indirectly to activate a cleaning fluid pump in such a manner that cleaning fluid can be applied to a vehicle window exclusively in front of the wiper blade in the respective wiping direction.

Despite being relatively simple and therefore inexpensive to produce, the wiper motor according to the invention is therefore capable of being used in a wiping apparatus which has a particularly low consumption of cleaning fluid on account of cleaning fluid being applied to a vehicle window exclusively in front of the wiper blade in the respective wiping direction.

Advantageous developments of the wiper motor according to the invention are cited in the dependent claims. All of the combinations of at least two of the features disclosed in the claims, the description and/or the figures fall within the scope of the invention.

In a design of the wiper motor which is structurally preferred because of being relatively simple and inexpensive to produce, it is provided that the means has at least one resistance path and a contact of a line, which contact interacts with the at least one resistance path, wherein the at least one resistance path and the contact of the line are arranged movably relative to each other, and wherein the at least one resistance path or the at least one contact of the line is connected at least indirectly to the output shaft in a fixed manner in terms of angle of rotation.

In order to make it possible for cleaning fluid to be able to be sprayed onto the vehicle window both in the one direction of movement of the wiper blade and in the other direction, it is provided, in a development of the last-mentioned proposal, that two resistance paths are provided, wherein the first resistance path is designed for identifying the two reversal positions of the wiper blade and the second resistance path is designed for defining an angular range for activating the pump. The two resistance paths provided according to the invention achieve objects which are therefore independent of each other. While the one resistance path is designed (merely) to detect the reversal positions during a rotation of the output shaft of the wiper motor, the other resistance path serves to activate the cleaning fluid pump, depending on the identified reversal position, in such a manner that cleaning fluid can be applied to the vehicle window in the desired angular range during the movement of the wiper blade.

In a structurally particularly preferred refinement of the at least one resistance path, the latter is arranged on an end side of a gear wheel connected to a driving motor. A structural solution of this type has the advantage in particular that the gear wheel, which is already present in a wiper motor of this type, can be used as a carrier for the at least one resistance path and therefore the additional structural outlay is relatively small. The at least one resistance path can be arranged on a ratchet wheel connected to the gear wheel, or directly on the surface of the gear wheel.

It can be provided that the second resistance path has a single contact region which is assigned to a to or a fro movement of the at least one wiper blade between the reversal points. In a structural design of this type, it is provided that the cleaning fluid is applied to the vehicle window merely in a movement of the wiper blade, for example during a movement of the wiper blade from the inoperative position thereof, in which the wiper blade is located in the vicinity of the engine bonnet, in the direction of the other reversal position thereof.

Alternatively thereto, it can also be provided, however, that the second resistance path has two separate, segment-like contact regions which are each assigned to a to or a fro movement of the at least one wiper blade between the reversal points. A design of this type of the second resistance path makes it possible to apply cleaning fluid to the vehicle window in both directions of movement of the wiper blades. In this connection, it is made possible, by means of a corresponding refinement of the segment-like contact regions of the second resistance path, for example, to apply cleaning fluid, during a first direction of movement of the wiper blade, in a different angular range (with respect to the movement of the wiper blade) than in the other direction of movement of the wiper blade.

The invention also comprises a wiping apparatus for wiping a vehicle window, with at least one wiper blade, at least one spray device for applying a cleaning fluid to the vehicle window, a pump for supplying the at least one spray device with cleaning fluid, and a wiper motor according to the invention.

In a development of a wiping apparatus of this type, it is provided that additional means for influencing the activation of the pump are provided, in particular additional means for temporally influencing the activation of the pump. Additional means of this type can consist, for example, in a delay time, which is dependent on the driving speed, during an activation of the pump, or in a delivery quantity of the pump which changes depending on the driving speed or external temperatures.

In a first structural arrangement of the spray device it is provided that at least two spray devices are provided, wherein a respective spray device is assigned to a wiper blade longitudinal side which is located in front of the wiper blade in the wiping direction. A refinement of this type of the spray devices can be achieved, for example, by means of two spray devices arranged in a positionally fixed manner on the bodywork of the vehicle, wherein the two spray devices are each activated depending on the direction of movement of the wiper blade.

However, a structural refinement in which the at least two spray devices are formed on the wiper blade by spray openings on the longitudinal sides of the wiper blade, is particularly preferred.

In order to activate the spray devices, which are provided for different directions of movement of the wiper blade, as required, it can be provided that the pump is designed as a bidirectional pump for supplying different spray devices.

Furthermore, it is provided, in a structural development of the wiping apparatus, that a control unit is provided for activating the pump, wherein the control unit is connected on the input side to the wiper motor and to an actuating device for the at least one spray device, and in that evaluation means for identifying the angular position of the at least one wiper blade are provided in the control unit. Put in other words, this means that the wiper motor supplies the signals, which are produced by the resistance paths, as input variables to the control unit which then draws a conclusion about the corresponding angular position of the at least one wiper blade in order to activate the pump in the desired manner.

However, in an alternative refinement, it can also be provided that a control unit is provided for activating the pump, wherein the control unit is connected on the input side to the wiper motor, in that evaluation means for identifying the angular position of the at least one wiper blade are provided in the control unit, and in that the voltage supply of the pump takes place via an actuating device for the at least one spray device.

Further advantages, features and details of the invention emerge from the description below of preferred exemplary embodiments and with reference to the drawing.

Figure 2:
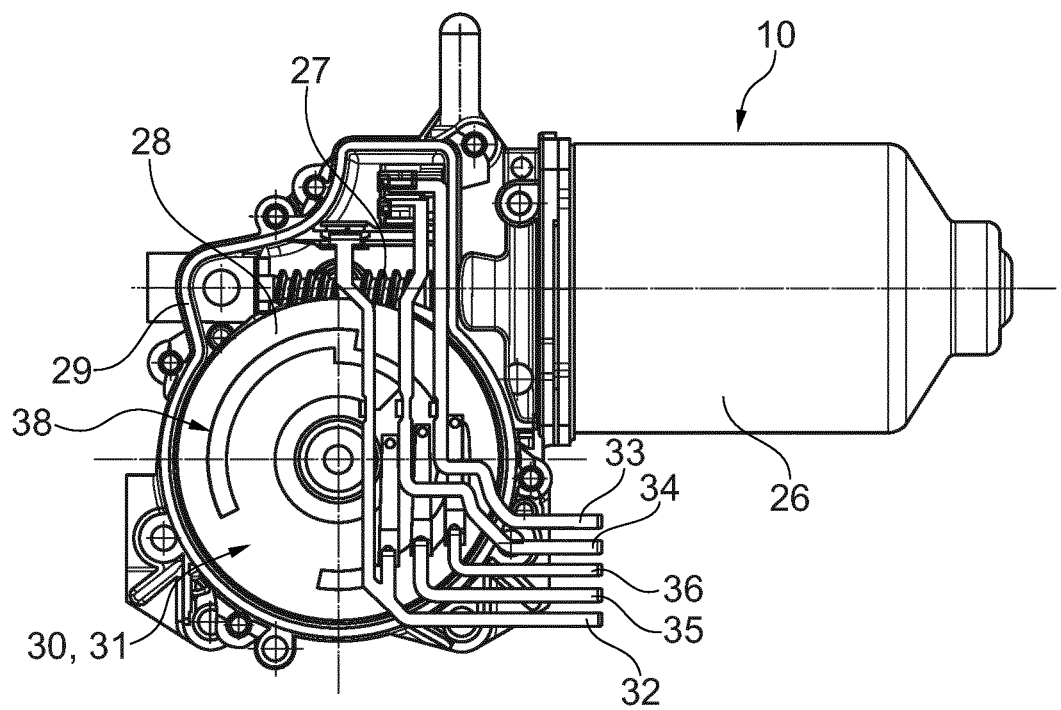
Figure 3:
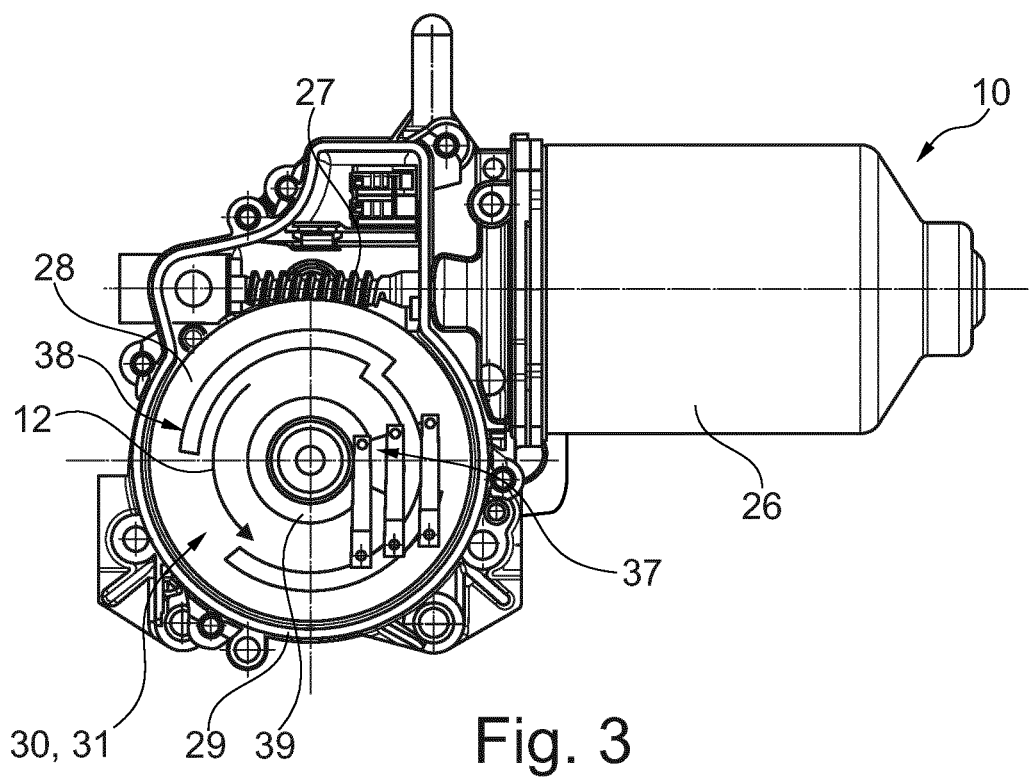
Figure 6:
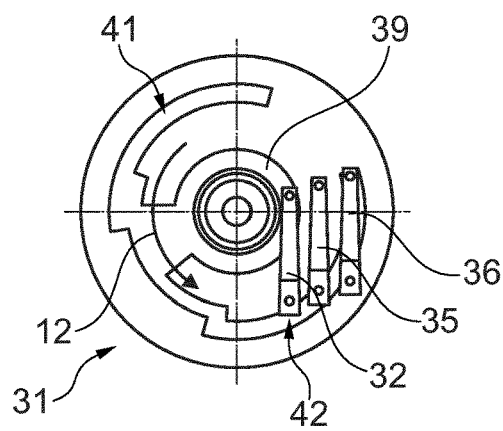
Figure 7:
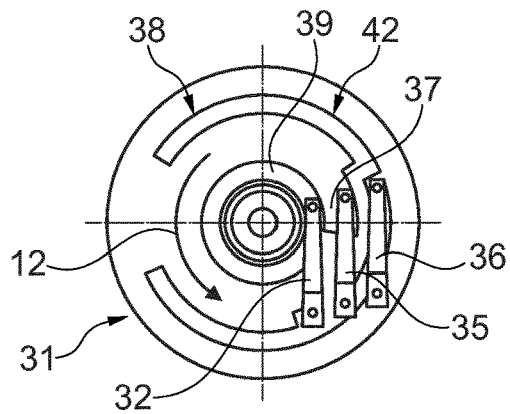
Figure 8:
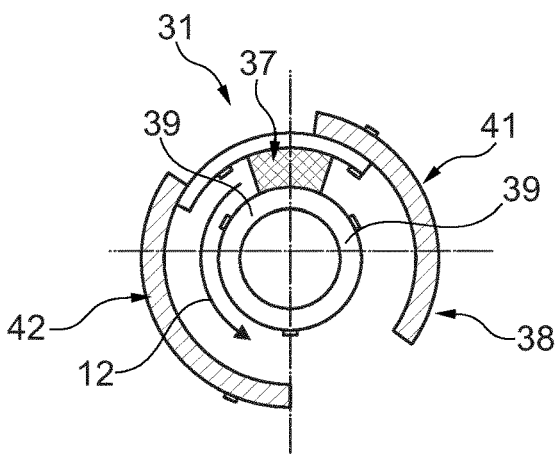
Figure 9:
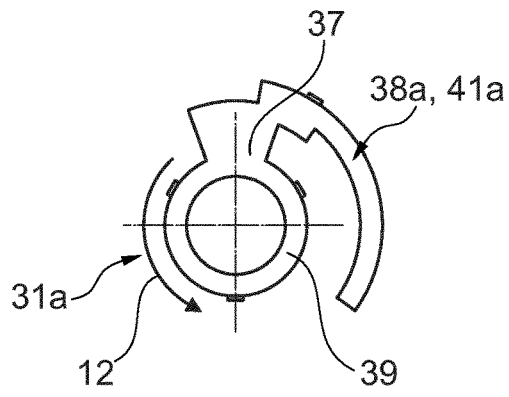
Figure 10:
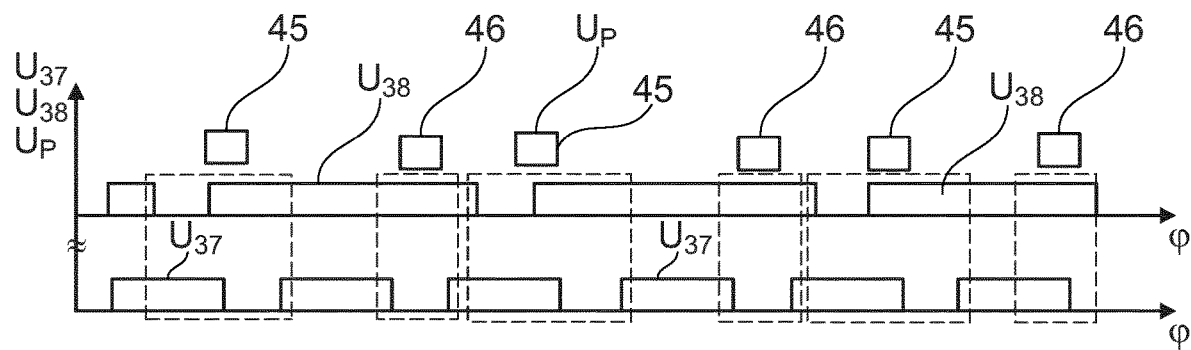
Figure 11:
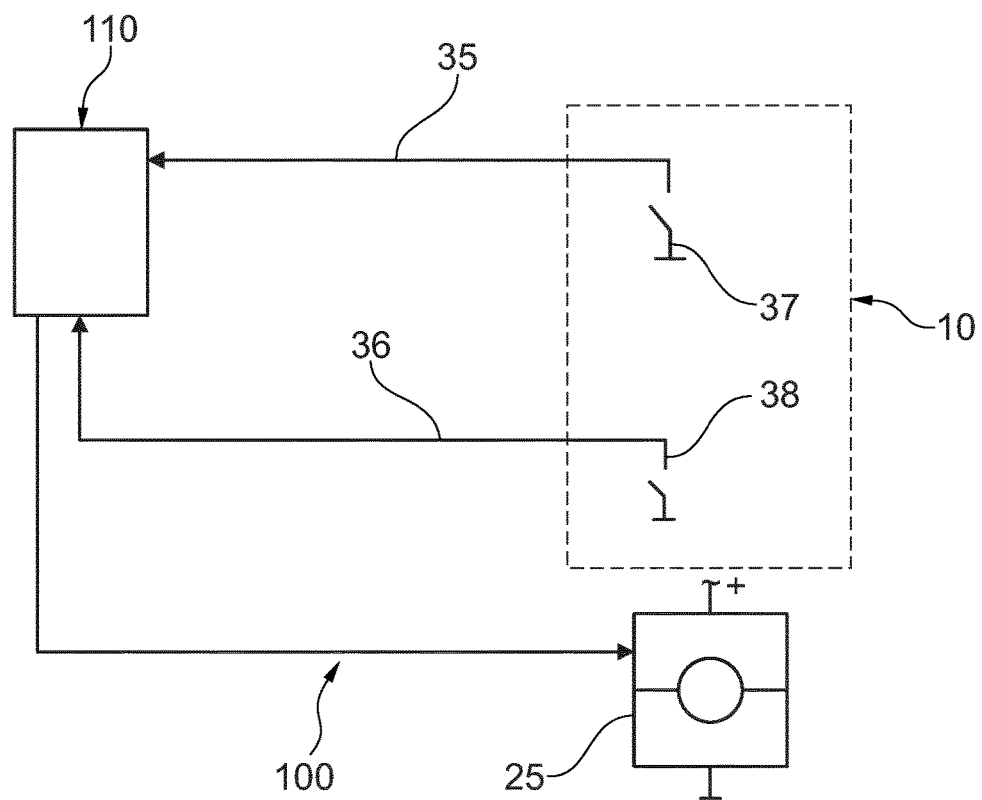
Figure 12:
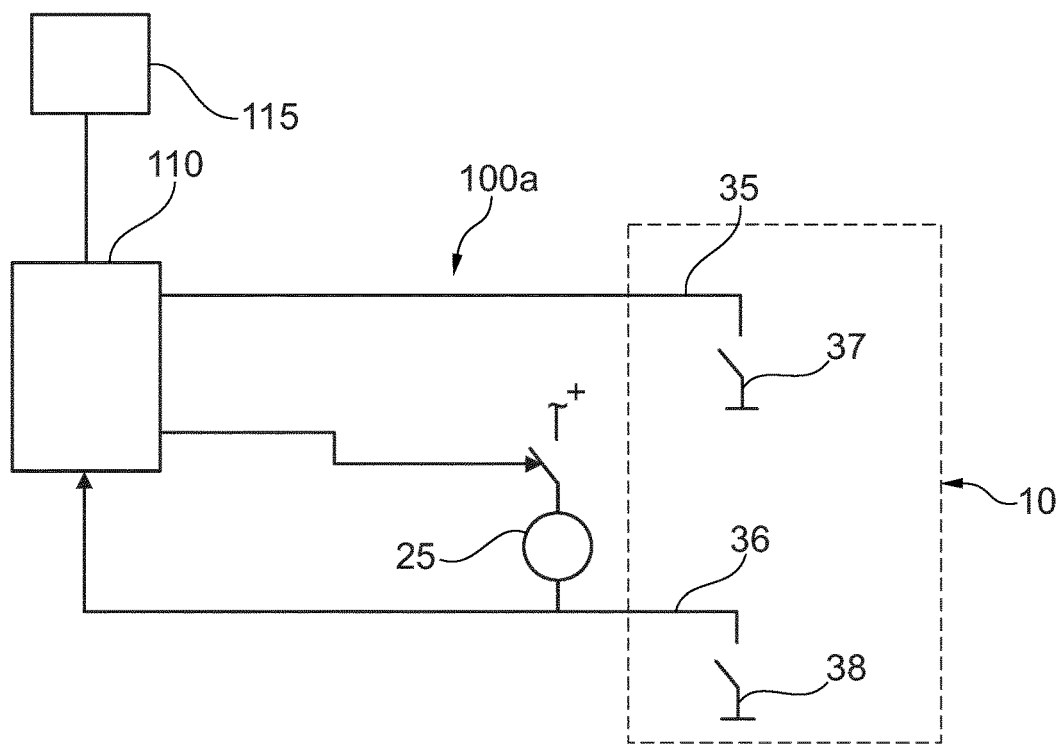
Figure 13:
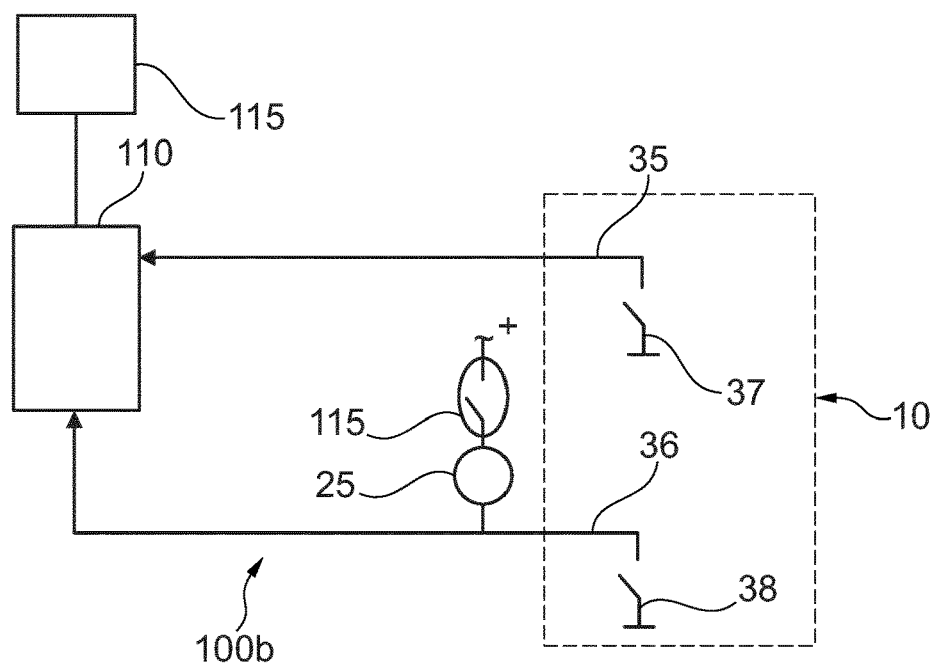

In the drawing:

FIG. 1 shows a simplified illustration of a wiping apparatus, with the use of a wiper motor according to the invention, FIG. 2 shows a top view of a wiper motor according to the invention with gear box cover removed, FIG. 3 shows the wiper motor according to FIG. 2 without illustrating electric lines interacting with resistance paths, FIG. 4 to FIG. 7 show an illustration of the resistance paths and contacts interacting therewith on a gear wheel during different positions of the gear wheel, FIG. 8 shows a simplified illustration of a resistance path having two segments in order to realise the application of cleaning fluid in different directions of movement of a wiper blade, FIG. 9 shows an illustration of a switching disc with just one segment on a resistance path for applying a cleaning fluid in just one direction of movement of the wiper blade, FIG. 10 shows an illustration of the activation of the cleaning fluid pump via the angle of rotation of the output shaft of the wiper motor, and FIG. 11 to FIG. 13 show simplified illustrations of electric circuit diagrams of different wiping apparatuses, with the use of a wiper motor according to the invention.

Identical elements or elements having an identical function are provided with the same reference signs in the figures.

FIG. 1 illustrates a wiping apparatus 100 which serves for cleaning a vehicle window 2. The vehicle window 2, as in the exemplary embodiment illustrated, may be a windscreen of a vehicle or else (not illustrated) a rear window of a vehicle. The wiping apparatus 100 has a wiper motor 10 according to the invention, the output shaft 11 of which is driven rotatably only in a single direction of rotation, in the anticlockwise direction in the direction of the arrow 12 in the exemplary embodiment illustrated. Of course, however, the wiper motor 10 is designed to operate at different rotational speeds or in the intermittent mode depending on the activation of the wiper motor 10.

The wiper motor 10 or the output shaft 11 thereof is coupled via a wiper linkage 15 (illustrated in simplified form) to two wiper arms 16, 17, to which a respective wiper blade 1 is interchangeably fastened. During the operation of the wiper motor 10, the two wiper blades 1 are moved to and fro between two reversal points A and B.

It is preferably provided that the wiper blades 1 are designed as "aqua blades". A wiper blade 1 of this type is distinguished in that a plurality of spray nozzles 101, 102 are in each case arranged on at least one, preferably on both longitudinal sides of the wiper blade 1. The spray nozzles 101, 102 serve to spray a cleaning fluid in front of the respective wiper blade 1 in the respective wiping direction. Alternatively, it can also be provided that spray nozzles 103 are arranged, for example, on the upper edge of the vehicle window 2. The spray nozzles 101, 102 and 103 respectively form a spray device 21, 22, 23.

The spray devices 21 to 23 are supplied with cleaning fluid via a pump 25 which supplies the cleaning fluid from a storage container (not illustrated) via supply tubes to the respective spray device 21 to 23. Both the wiper motor 10 and the pump 25 are connected to a control unit 110 which serves for activating the wiper motor 10 or the pump 25. The control unit 110 is coupled in turn to an actuating device 115 which is designed, for example, as a steering column switch. The driver of the vehicle specifies the corresponding washing function of the wiping apparatus 100 via the steering column switch or the actuating device 115. Evaluation means 116, in particular in the form of a logic circuit, such as an IC or the like, are arranged in the control unit 110 and are designed to determine the angular position or position of the wiper blades 1 and the direction of movement thereof. Furthermore, the control unit 110 can be assigned additional means 105 which additionally influence the activation of the wiper motor 10 and of the pump 25, for example additional means 105 in the form of a time control.

FIGS. 2 and 3 illustrate the wiper motor 10 in more detail. The wiper motor 10 has a driving motor 26 which is designed as an electric motor and the output shaft of which meshes via a worm toothing 27 with a gear wheel 28 in the form of a spur gear. The gear wheel 28 serves for at least indirectly driving the output shaft 11 of the wiper motor 10. The gear wheel 28 is arranged within a gear box 29, onto which the driving motor 26 is flange-mounted in the exemplary embodiment illustrated. Furthermore, the gear box 29 has a gear box cover (not illustrated in FIGS. 2 and 3) in order to protect the interior of the gear box 29. Means 30 which serve to detect the position of the wiper blades 1 are arranged on the one end side of the gear wheel 28. The means 30 can be designed, for example, in the form of a switching disc 31 which is designed in the form of a component which is separate from the gear wheel 28 but is connected to the gear wheel 28 for rotation therewith. Alternatively thereto, it is also possible, however, for the means 30 to be connected integrally to the gear wheel 28.

As can be seen in particular with reference to FIG. 2, the wiper motor 10 has five lines 32 to 36 in the form of pressed screen lines which serve for the electric activation of the wiper motor 10 and for the electric contact connection to the control unit 110. The line 32 constitutes an earth line of the wiper motor 10 here. The two lines 33, 34, which are electrically conductively connected directly to the driving motor 26, serve for activating the driving motor 26 for different wiping speeds or rotational speeds.

Furthermore, the line 35 serves for identifying the one reversal point A, wherein the pump 25 is not activated in the reversal point A. The line 36 serves in turn for at least indirectly activating the pump 25. For this purpose, the two lines 35, 36 are formed, according to the illustration of FIGS. 4 to 7, on the side facing the switching disc 31 as sliding contacts which interact with resistance paths 37, 38 which are formed on the switching disc 31, are arranged concentrically with respect to the axis of rotation of the gear wheel 28 and are connected integrally to each other. The two resistance paths 37, 38, which are formed in the manner of segments, permit a current flow when the resistance path 37, 38 is in contact with the corresponding line 35, 36 or with the sliding contact assigned thereto. Furthermore, the two resistance paths 37, 38 are in electric contact connection with the line 32 via an annular earth path 39 arranged concentrically with respect to the axis of rotation of the gear wheel 28.

FIGS. 4 to 7 illustrate different positions of the switching disc 31 or of the gearwheel 28 during rotation of the gearwheel 28 in the direction of the arrow 12, wherein, in the exemplary embodiment illustrated, the direction of rotation of the gearwheel 28 corresponds to the direction of rotation of the output shaft 11.

Figure 4:
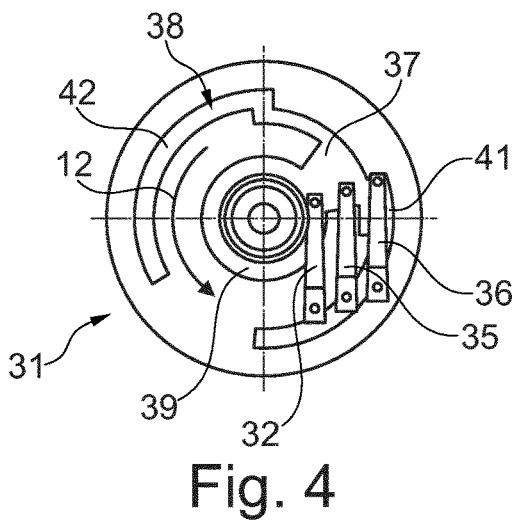

FIG. 4 illustrates the state in which the line 35, which serves for detecting the reversal point A, is arranged in electrically conductive contact with the resistance path 37. Furthermore, the sliding contact of the line 36, which sliding contact serves for activating the pump 25, runs precisely onto a first segment 41 of the second resistance path 38. As a result, it is possible, when the actuating device 115 is actuated, for the pump 25 to be activated in order to apply cleaning fluid to the vehicle window 1. It is essential here for the arc length of the first segment 41 of the second resistance path 38 to define an angular range a which is illustrated in FIG. 1 and in which cleaning fluid can be applied to the vehicle window 2 during a movement of the wiper blade 1 from the reversal point A in the direction of the reversal point B.

Figure 5:
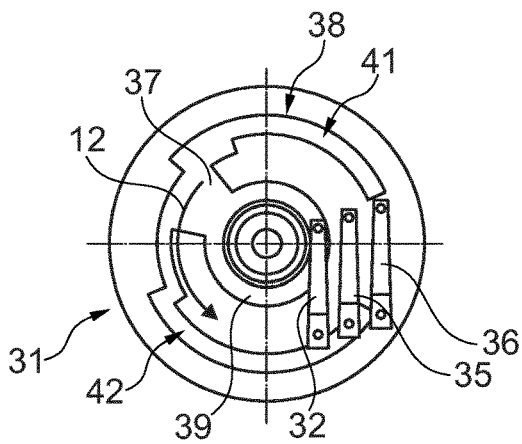

It can be seen in FIG. 5 that the sliding contacts of the two lines 35, 36 are not operatively connected to the corresponding resistance paths 37, 38. A position of this type of the switching disc 31 typically occurs directly before the reversal position B is reached. Since, in this position, a current does not flow via the lines 35, 36, the evaluation device 116 arranged in the control unit 110 concludes that no cleaning fluid should be conveyed, i.e. that the pump 25 is connected currentlessly.

FIG. 6 illustrates the state in which the line 36 makes electrical contact with the second segment 42 of the second resistance path 38. In this position of the switching disc 31, which position is taken up directly after leaving the reversal point B during the movement of the wiper blade 1 in the direction of the reversal point A, cleaning fluid can again be applied to the vehicle window 1, i.e. the pump 25 is activated when the actuating device 115 is actuated.

Finally, FIG. 7 illustrates the state in which the line 36 is just leaving the second segment 42 of the second resistance path 38 while the line 35 is not yet operatively connected to the resistance path 37. This position is characteristically shortly before the (original) reversal point A or the parking position is reached. Cleaning fluid is not applied to the vehicle window 2 in this position either.

FIG. 8 once again illustrates, in an individual illustration, the switching disc 31 with the two segments 41, 42 of the first resistance path 37 for identifying the reversal position A or the parking position of the wiper blade 1, and of the second resistance path 38, and also the earth path 39.

FIG. 9 illustrates a switching disc 31a which is modified in relation to FIG. 8 and merely has an earth path 39, the resistance path 37 and a resistance path 38a having a single segment 41a. Owing to the fact that, in comparison to the switching disc 31, the second segment 42 is missing at the resistance path 38a, the pump 25 is activated only during a movement of the wiper blades 1 from the reversal point A in the direction of the reversal point B. It is, of course, provided for this case that the wiper blades 1 have only the one spray nozzles 101, but no spray nozzles 102.

FIG. 10 illustrates the voltage signals $U_{37}$, $U_{38}$ to the resistance paths 37, 38 and the activation signal $U_P$ of the pump 25 via the angle of rotation 9 of the output shaft 11 of the wiper motor 10 and via the position of the switching disc 31, respectively. A voltage signal here corresponds to the state in which a current flows via the resistance path 37, 38 and line 35, 36 assigned thereto. In particular, first angular ranges 45 are seen, in which cleaning fluid is applied during a movement of the wiper blades 1 from the reversal point A in the direction of the reversal point B, and second angular ranges 46 are seen, in which cleaning fluid is applied to the vehicle window 2 during a movement of the wiper blades 1 from the direction of the reversal point B in the direction of the reversal point A. The direction of movement of the wiper blades 1 is determined here from the sequence of the occurrence and the direction of the voltage signals $U_{37}$, $U_{38}$.

FIG. 11 illustrates, as an addition to the illustration of FIG. 1, that the pump 25 which is activated by the control unit 110 is designed as a bi-directional pump 25 with two hydraulic outputs in such a manner that a corresponding activation of the pump 25 takes place depending on which of the two segments 41, 42 of the resistance path 38 is contacted by the line 36, and therefore, for example, either the one spray nozzles 101 on the one longitudinal side of the wiper blades 1, or else the other spray nozzles 102 on the other longitudinal side of the wiper blades 1, are supplied with cleaning fluid.

FIG. 12 illustrates a wiping apparatus 100a in which the voltage supply of the pump 25 takes place via the control unit 110. Finally, FIG. 13 illustrates a wiping apparatus 100b in which the voltage supply of the pump 25 takes place via the actuating device 115 (in the form of a steering column lever). Furthermore, the voltage supply of the pump 25 is coupled directly to the line 36 which also leads to the control unit 110.

The wiping apparatuses 100, 100a and 100b described to this extent and also the wiper motor 10 can be modified in diverse ways without departing from the inventive concept. The use of a wiper motor 10 which is driveable merely in one direction of rotation and which makes it possible to apply cleaning fluid to the vehicle window 2 only in the direction in which the wiper blade 1 is currently moving, is essential.

LIST OF REFERENCE SIGNS

1 Wiper blade
2 Vehicle window
10 Wiper motor
11 Output shaft
12 Arrow
15 Wiper linkage
16 Wiper arm
17 Wiper arm
21 Spray device
22 Spray device
23 Spray device
25 Cleaning fluid pump
26 Driving motor
27 Worm toothing
28 Gear wheel
29 Gear box
30 Means
31, 31a Switching disc
32 Line
33 Line
34 Line
35 Line
36 Line
37 Resistance path
38, 38a Resistance path
39 Earth path
41, 41a Segment
42 Segment
45 Angular range
46 Angular range
100, 100a, 100b Wiping apparatus
101 Spray nozzle
102 Spray nozzle
103 Spray nozzle
105 Means
110 Control unit
115 Actuating device
116 Evaluation means
A Reversal point
B Reversal point
α Angular range
β Angular range
φ Angle of rotation

The invention claimed is:

1. A wiper motor, comprising:
an output shaft which rotates in exclusively one direction and is configured at least indirectly to move at least one wiper blade between two reversal positions; and
means for activating, at least indirectly, a pump for conveying a cleaning fluid in such a manner that cleaning fluid can be applied to a vehicle window exclusively in front of the wiper blade in the respective wiping direction,
wherein the means for activating comprises a first resistance path, a second resistance path, and an annular earth path that are formed by a single piece of resistance material and connected integrally to each other, the second resistance path being electrically connected to the annular earth path within the single piece of resistance material via the first resistance path,
wherein the first resistance path, and the second resistance path, and the annular earth path are arranged movably relative to at least one contact of a line to form a sliding electric contact connection with the at least one contact of the line, and
wherein the first resistance path is for identifying the two reversal positions of the wiper blade and the second resistance path is for defining an angular range for activating the pump.

2. The wiper motor according to claim 1,
wherein the at least one contact of the line is connected at least indirectly to the output shaft in a fixed manner in terms of angle of rotation.

3. The wiper motor according claim 2, wherein the at least one resistance path is arranged on an end side of a gear wheel connected to the output shaft of the wiper motor.

4. The wiper motor according to claim 1, wherein the first resistance path and the second resistance path are connected at least indirectly to the output shaft in a fixed manner in terms of angle of rotation.

5. The wiper motor according to claim 4 wherein the second resistance path has a single contact region which is assigned to a to or a fro movement of the at least one wiper blade between the reversal points.

6. The wiper motor according to claim 4, wherein the second resistance path has two separate contact regions which are each assigned to a to or a fro movement of the at least one wiper blade between the reversal points.

7. A wiping apparatus for wiping a vehicle window, comprising:
at least one wiper blade;
at least one spray device for applying a cleaning fluid to the vehicle window;
a pump for supplying the at least one spray device with cleaning fluid; and
a wiper motor comprising:
an output shaft which rotates in exclusively one direction and is configured at least indirectly to move at least one wiper blade between two reversal positions; and
means for activating, at least indirectly, a pump for conveying a cleaning fluid in such a manner that cleaning fluid can be applied to a vehicle window exclusively in front of the wiper blade in the respective wiping direction,
wherein the means for activating comprises a first resistance path, a second resistance path, and an annular earth path that are formed by a single piece of resistance material and connected integrally to each other, the second resistance path being electrically connected to the annular earth path within the single piece of resistance material via the first resistance path,
wherein the first resistance path, and the second resistance path, and the annular earth path are arranged movably relative to at least one contact of a line to form a sliding electric contact connection with the at least one contact of the line, and wherein the first resistance path is for identifying the two reversal positions of the wiper blade and the second resistance path is for defining an angular range for activating the pump.

8. The wiping apparatus according to claim 7, wherein additional means for temporally influencing the activation of the pump are provided.

9. The wiping apparatus according to claim 7, wherein at least two spray devices are provided, wherein a respective spray device is assigned to a wiper blade longitudinal side which is located in front of the wiper blade in the wiping direction.

10. The wiping apparatus according to claim 9, wherein the at least two spray devices are formed on the wiper blade by spray nozzles on the longitudinal sides of the wiper blade.

11. The wiping apparatus according to claim 9, wherein the at least two spray devices are formed by spray nozzles arranged in a region of a vehicle bodywork.

12. The wiping apparatus according to claim 9, wherein the pump is a bidirectional pump for supplying different spray devices.

13. The wiping apparatus according to claim 7, wherein a control unit is provided for activating the pump, wherein the control unit is connected on an input side to the wiper motor and to an actuating device for the at least one spray device and wherein evaluation means for identifying the angular position of the at least one wiper blade are provided in the control unit.

14. The wiping apparatus according to claim 7, wherein a control unit is provided for activating the pump, wherein the control unit is connected on an input side to the wiper motor, wherein evaluation means for identifying the angular position of the at least one wiper blade are provided in the control unit, and wherein the voltage supply of the pump takes place via an actuating device for the at least one spray device.

* * * * *